UNITED STATES PATENT OFFICE.

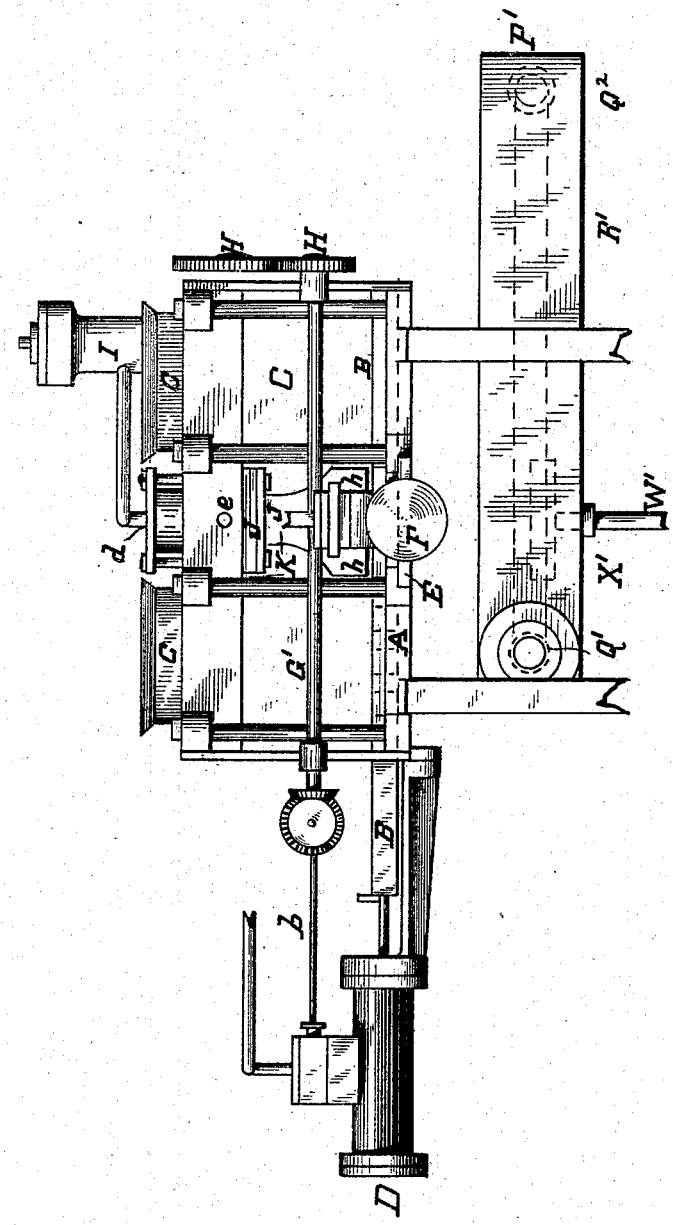

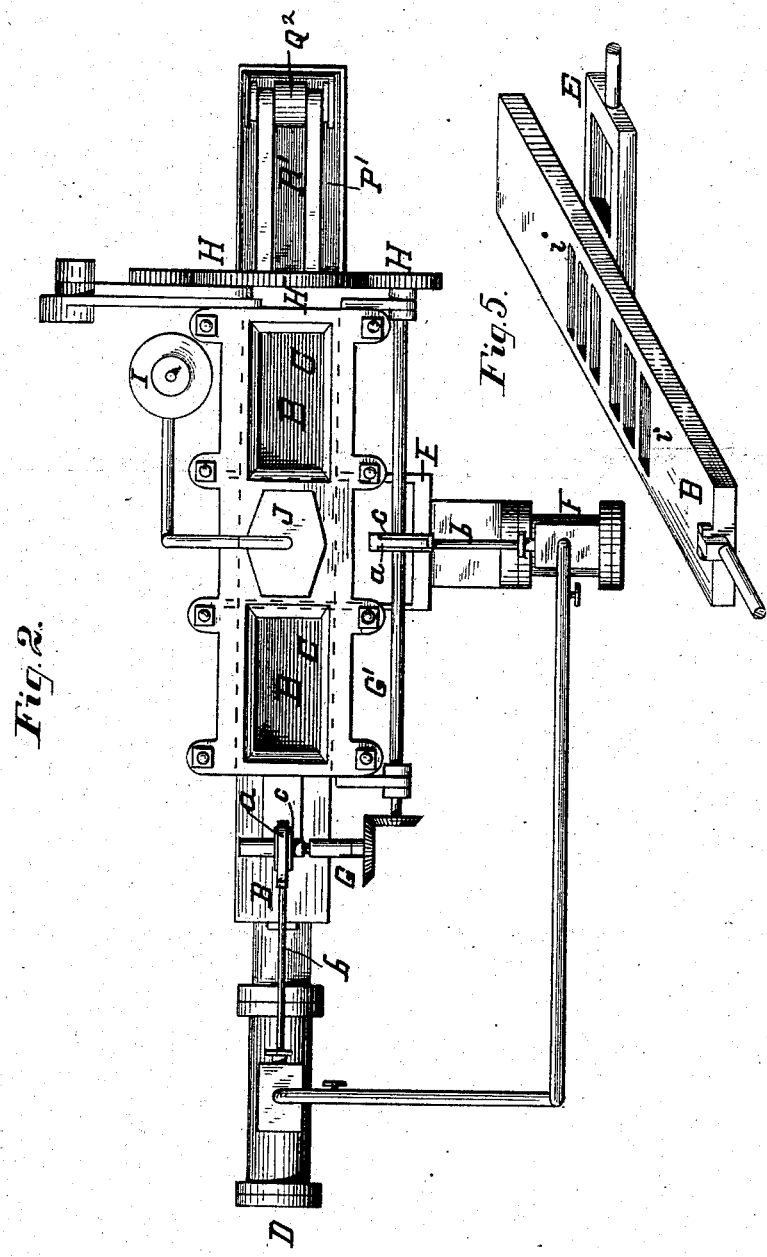

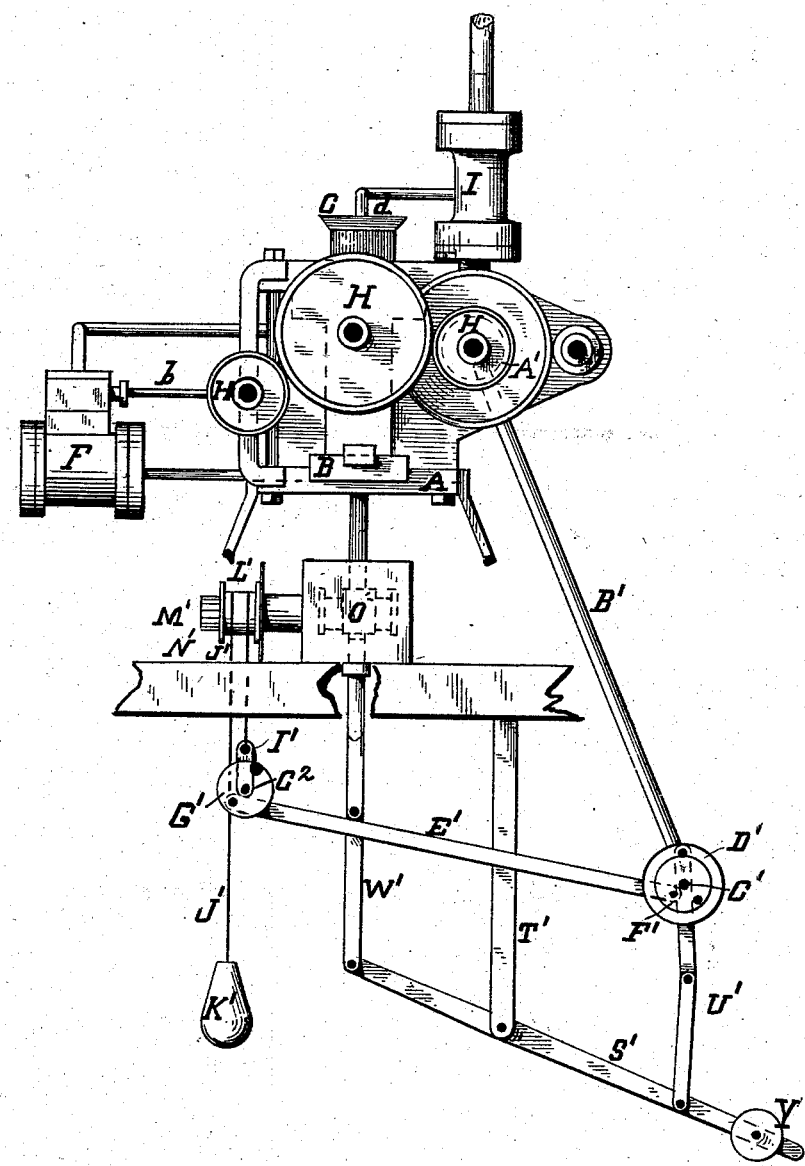

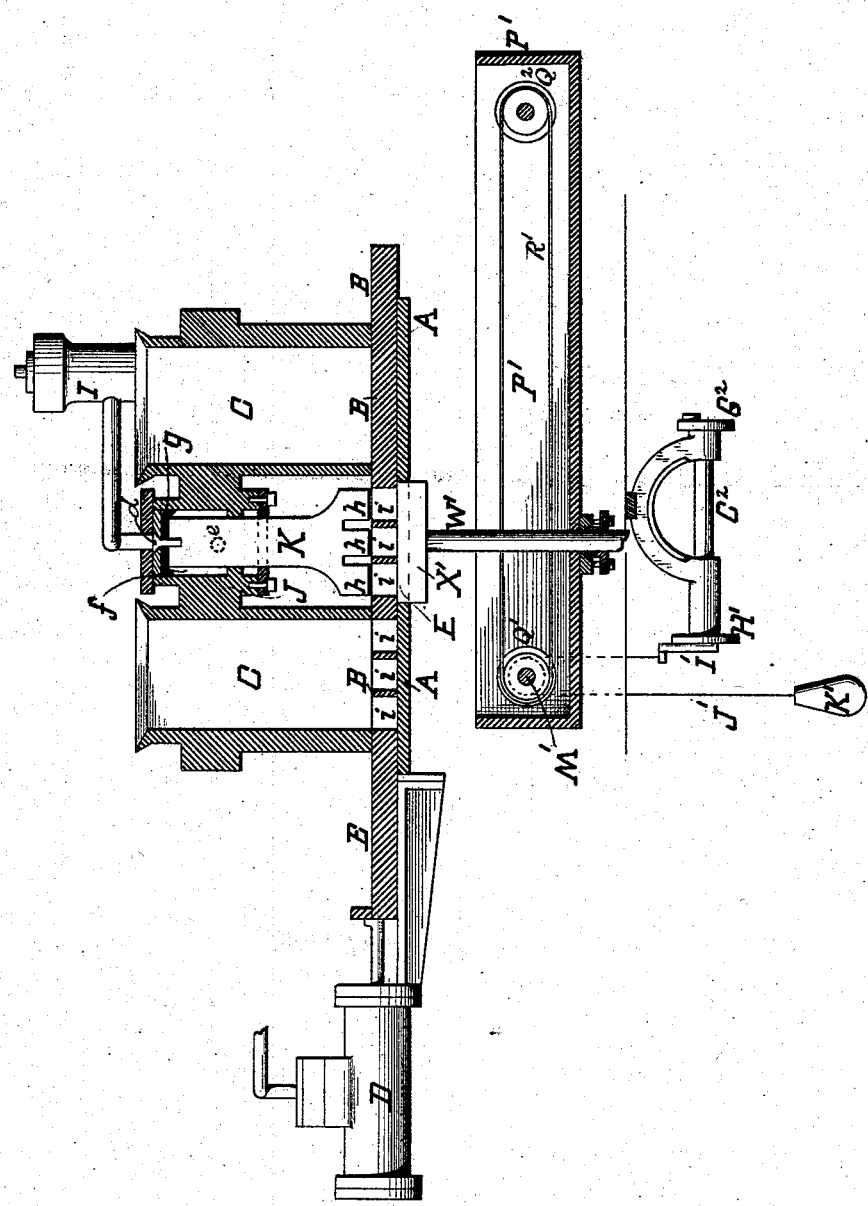

JOHN GAUNT, OF GLOUCESTER, NEW JERSEY, WILLIAM F. POIESZ, OF PHILADELPHIA, PENNSYLVANIA, AND WILLIAM CALHOUN AND JACOB C. DAUBMANN, OF CAMDEN, NEW JERSEY.

MACHINE FOR MAKING PAVING-BLOCKS, BRICKS, &c.

SPECIFICATION forming part of Letters Patent No. 291,505, dated January 8, 1884.

Application filed October 5, 1883. (No model.)

*To all whom it may concern:*

Be it known that we, JOHN GAUNT, residing at Gloucester, in the county of Camden and State of New Jersey, WILLIAM F. POIESZ, residing at Philadelphia, in the county of Philadelphia and State of Pennsylvania, and WILLIAM CALHOUN and JACOB C. DAUBMANN, both of Camden, in the county of Camden and State of New Jersey, and all citizens of the United States, have invented a new and useful Machine for Making Paving-Blocks, Bricks, &c., of which the following is a specification.

At one end of a bed or base is a power-cylinder, to the piston-rod of which is fixed a mold-board having cavities of the shape designed for their particular use. Transversely beneath the mold-board is a pressure-plate, which is operated by a similar cylinder. Steam is applied to these cylinders by valves, which have straps or yokes on the ends of their stems, which engage with cams or eccentrics on transverse and horizontal shafts. Hoppers for supplying material to be pressed are placed above the mold and pressure boards, and on opposite sides of a pressure-cylinder having compressors of the size and shape of the cavities of the mold-board. The movement of these compressors is effected by hydraulic power, a valve and pump of the usual description being employed. When the material in the molds is pressed, the pressure-plate is moved across the machine by its cylinder until its opening is beneath the cavities; then the compressors force the blocks onto a vertically-moving table, which places them on an endless band moving through a trough of running water, whereby they are cooled and hardened.

On reference to the accompanying drawings, making part of this specification, Figure 1 is a side elevation. Fig. 2 is a plan view. Fig. 3 is an end elevation. Fig. 4 is a longitudinal vertical section. Fig. 5 is a perspective view of the relative positions of the mold-board and pressure-plate.

Similar letters refer to similar parts in the several views.

A is the bed or base of the machine.

B is a mold-board, which has a longitudinal movement beneath the hoppers C by means of a cylinder, D, at the end of the bed.

E is a pressure-plate operated by a cylinder, F. The admission of steam to the cylinders is governed by the motion communicated to the respective valves through straps or yokes $a$ on the ends of their respective valve-rods $b\ b$, in connection with eccentrics or cams $c\ c$ on the transverse and longitudinal shafts G G', which are turned by the gear or friction wheels H at the end of the machine. The hoppers C are placed above the mold-board B, and at a distance apart, for the alignment of the compressors with cavities of the said mold-board.

I is a water-valve, which communicates with a cylinder, J, by openings $d\ e$, and water is admitted alternately through the passages to each end. Within the cylinder is a plunger, K, surrounded by an annular water-space $f$. A washer or plate, $g$, is fitted to the cylinder and fixed to the top of the plunger, against which the pressure of the water is applied for producing motion. The bottom end of the plunger is fitted with compressors $h$ similar to the cavities $i$ of the mold-board. In Fig. 4 the top passage, $d$, is shown open, and the pressure of the water is applied at that end to send the compressors into the cavities of the mold-board. When the plunger reaches the end of its stroke, the valve I changes the direction of the water-pressure from the top to the under side of the washer $g$ for the return-stroke, and the water which, during the previous stroke, entered through the opening $d$, will now be discharged through it and admitted through the bottom passage, $e$. The wheel A' connects, by a rod or wrapping connector, B', with that part of the machine which is employed for carrying off the bricks after they have left the cavities of the mold-board, which mechanism is placed in this instance beneath that just described, and is constructed as follows:

C' C², Figs. 1, 3, 4, are parallel shafts. The former receives motion from its pulley or crank wheel D', being connected by the rod B' to the wheel A'. The latter, C', is turned by the rod or wrapping connector E' between the pulleys or crank-wheels F' G' of the aforesaid shafts C' C².

On the extremity of the shaft C² is a fixed wheel, H', and a loose arm, I'. A pin, $j$, of the wheel operates upon the arm to turn it in the same direction.

J' is a cord of the arm I', attached to a weight, K', and which winds round a loose pulley, L', of the drum-shaft M', on the end of which the ratchet-wheel N' is made fast.

O' is a click freely jointed to the loose pulley L', for imparting its motion to the drum-shaft M.

P' is a water-trough having at opposite ends the drums Q' Q², around which pass the endless bearing-off belts R'.

S' is a lever turning upon the center of motion T'. It is acted upon by a jointed rod, U', which connects with a crank-wheel, V', on the end of the shaft C'. Its end $a'$ is hinged to a vertical rod, W', which passes water-tight through the bottom of the tank P', and has at its upper end the carrier or table X', for receiving the bricks or blocks as they are forced from the cavities of the mold-board. The weight Y' at the end $b$ recovers or counterbalances the rod and table.

The operation of the machine is as follows: Every time the mold-board B is moved beneath the hoppers C the cavities $i$ are respectively filled with brick material and pressed by the compressors $h$, after which the pressure-plate E is moved in by its cylinder until the bricks are dropped through the opening K onto the carrier X'. The wheel A', partaking of the action of the shafts G G', sets in motion the shafts C' C², through the medium of the rods or belts B' E', when the wheel H', arm I, cord J', weight K', pulley L', drum-shaft M', ratchet N', and click O' move the endless belts R' a space equal to the length of each set of cavities $i$. The revolution of the shaft C' causes the wheel V' to operate upon the bent arm U' of the lever S', and thus move the rod W' and the table X' for receiving and delivering the bricks.

As the belts R' are shifted, through the arrangement of the arm I', cord J', weight K', pulley L', drum-shaft M', ratchet N', and click O', the weight K' is partially raised, and by its traction restores the arm I' to the position it first occupied, without moving the belts R', which still remain in proper position to receive another charge of bricks.

We are aware that it has been proposed in brick-machines to employ a rotary mold-disk that brought the openings therein beneath the hopper to be filled, and then moved said openings to a position to cause the contents thereof to be compressed, and forced therefrom by plungers operated by hydraulic power; hence we make no broad claim thereto.

We claim as our invention—

1. The combination, in a brick-machine, of a mold-board, devices for reciprocating the same longitudinally, a vertically-moving compressor arranged above the mold-board, and reciprocated by hydraulic pressure to compress the material in the mold-board, a pressure-plate arranged as described, and devices for moving the same after the compressing operation, to permit the contents of the mold-board to pass or be forced therefrom, substantially as set forth.

2. The combination, in a brick-machine, of a mold-board, devices for longitudinally reciprocating the same, a vertically-moving compressor arranged above the mold-board to compress the material in the same, a pressure-plate arranged as described, devices for moving the same after the compressing operation, to permit the contents of the mold-board to pass or be forced therefrom, and a balanced conveyer arranged to receive said contents, substantially as set forth.

3. The combination, in a brick-machine, of a longitudinally-moving mold-board, a compressor arranged above the same, a pressure-plate, devices for transversely moving said pressure-plate to permit the contents of the mold-board to move or be ejected therefrom, a balance-conveyer arranged, as described, to receive said contents, and a belt arranged in a water-trough, substantially as and for the purpose set forth.

4. The combination, in a brick-machine, of molding and compressing devices, arranged as described, a balance-conveyer for depositing the molded bricks on a carrying-off belt, and devices for effecting a partial movement of said belt to carry the deposited bricks from beneath the conveyer and mold without operating the belt upon a reverse movement of said devices, substantially as and for the purpose set forth.

JOHN GAUNT.
WILLIAM F. POIESZ.
WILLIAM CALHOUN.
JACOB C. DAUBMANN.

Witnesses:
WILLIAM M. STEWART, Jr.,
FRANCIS D. PASTORIUS.